Feb. 2, 1965  A. F. GALLISTEL  3,168,203
MANUALLY OPERATED HYDRAULIC ACTUATOR CONTROL HAVING FEEL-BACK
Filed July 7, 1960  2 Sheets-Sheet 1
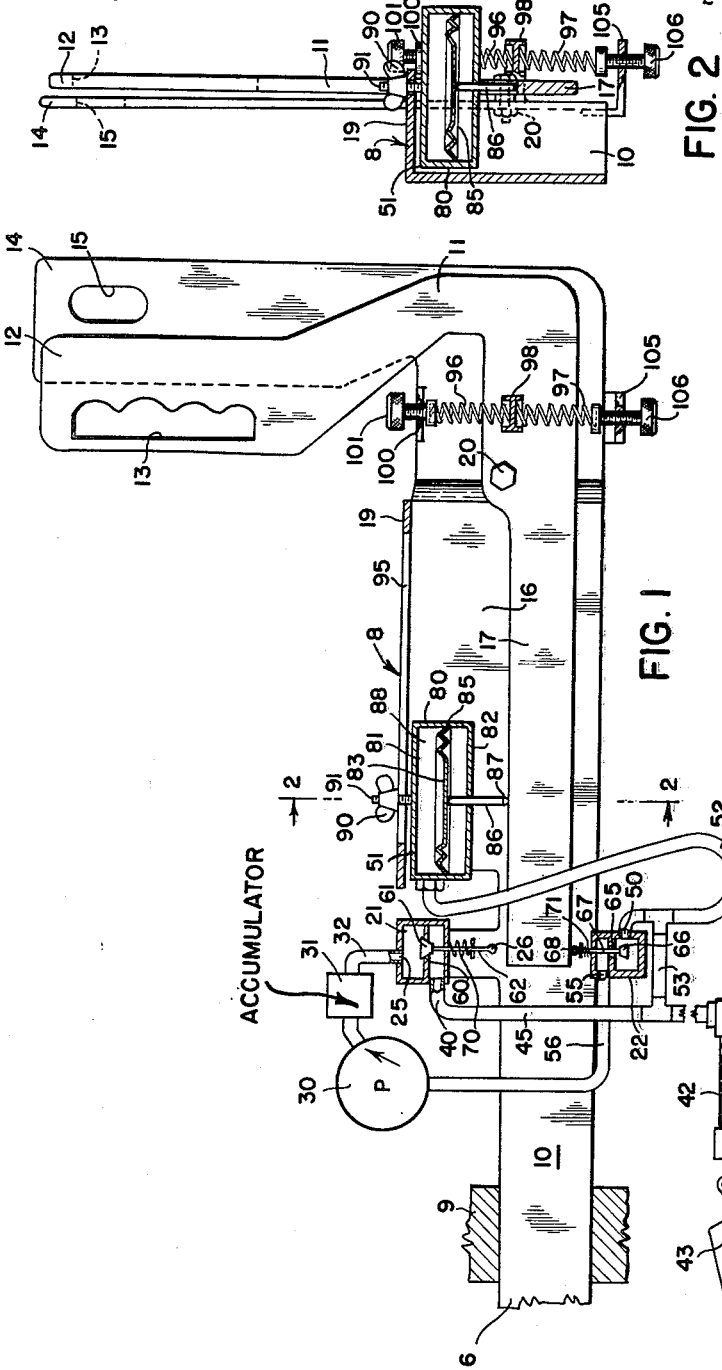
INVENTOR.
ALBERT F. GALLISTEL JR.
BY
*James L. Harmon*
AGENT

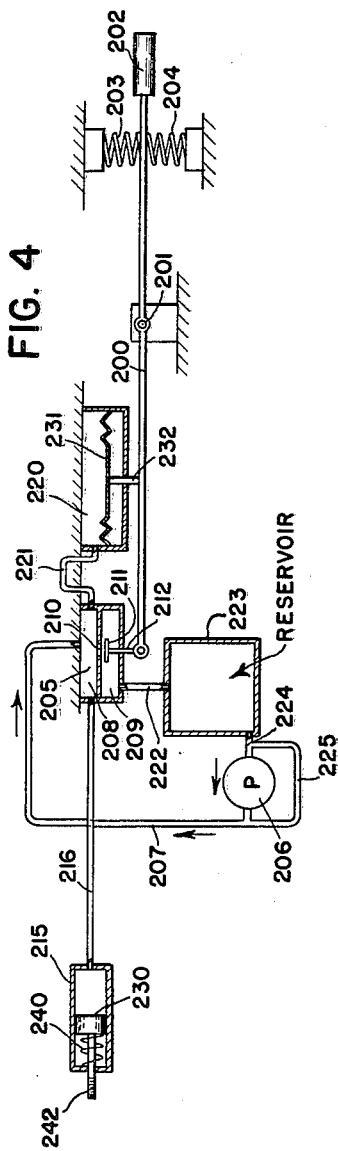
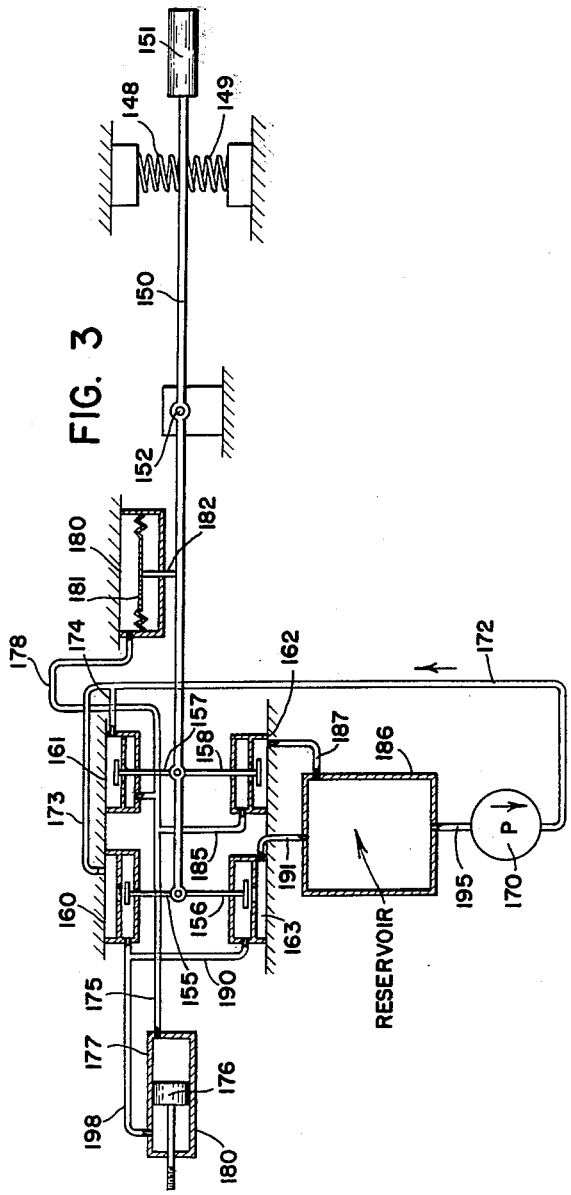

United States Patent Office 3,168,203
Patented Feb. 2, 1965

3,168,203
MANUALLY OPERATED HYDRAULIC ACTUATOR CONTROL HAVING FEEL-BACK
Albert F. Gallistel, Wayzata, Minn., assignor to General Mills, Inc., a corporation of Delaware
Filed July 7, 1960, Ser. No. 41,273
12 Claims. (Cl. 214—1)

This invention relates to manually operated hydraulic actuator controls and more particularly to manually operated hydraulic actuator controls which provide for the operator a tactile sense of the pressure being exerted by the actuator, i.e. "feel back." While the device has general application, the invention is particularly useful in connection with the gripping tongs or jaws of remotely controlled manipulators or mechanical arms and the like. For illustrative purposes, the invention will be described in connection with remotely controlled manipulators.

In recent years, remote handling equipment has become an important phase of the atomic industry, among others. Included in such remote handling devices are crane hoists, underwater corrosion resistant manipulators, manned and unmanned mobile manipulators, fuel handling devices and mechanical arms. The mechanical arm is a remote control device which will duplicate all or part of the motions of the human arm and hand. These mechanical arms ordinarily include an upper arm member rotatably on a base and provided with drive motors for controlling the motions thereof. Pivotally mounted on the end of the upper arm and adapted to be moved about this pivot by suitable motors is a lower arm member. A pair of gripping tongs or jaws are provided at the free end of the lower arm. The jaws are opened and closed by a suitable remotely controlled actuator. The present invention provides an improved method for opening and closing such jaws with a provision for allowing the operator to obtain a tactile sense (feel-back) of the pressure being exerted against an object by the jaws. This allows the mechanical arm to be used for manipulating delicate glassware and very heavy articles with equal dexterity.

Previous practices in the field of remote handling and control embrace four main types. The first is the so-called "master-slave" control which utilize the strength of the operator through a system of pulleys, cables and levers. These devices can exert only the force the operator exerts less all the frictional effects which, because of the system's complexity, may be considerable and may vary appreciably from time to time. The second is power devices, i.e. electrically powered or hydraulically powered devices, which utilize a meter or sound system for measuring pressure exerted. These devices are satisfactory, but require extra attention, i.e. observation or listening, by the operator. The third type of device is the electrical servo system which utilizes an electromotive device such as a D.C. motor to resist the operator's grip. This sort of system has been used, among other places, in aircraft but is usually rather complicated and quite expensive. Furthermore, since the output device often operates in a stationary or stalled condition, these electrical devices often tend to overheat. The present invention, in contrast, can operate in a stalled condition indefinitely, yet has no tendency to overheat, and is cheaper and easier to manufacture than these electrical devices. Still another type of device utilizes a direct mechanical linkage to the output device but is provided with a power assist mechanism coupled to the linkage to increase the power output. This type of system is, however, limited in its application since the output device cannot be moved from place to place with respect to the control device because of the direct mechanical linkage. The present invention is more satisfactory in this respect since flexible hydraulic hoses may be used which allow the manipulator to be moved in all directions with respect to the remotely placed control. A further disadvantage of previous devices is the inability to quickly and conveniently change the ratio between the pressure exerted by the output actuator and the tactile pressure detected by the operator.

It is therefore one object of this invention to provide an improved manually operated hydraulic actuator control which provides for the operator a tactile sense of pressure being exerted by the actuator.

It is another object of the present invention to provide an improved manually operated actuator control with feel-back which can exert a pressure of many times the strength of the human hand and in which the output device or actuator can be moved from place to place as desired.

It is still another object of the present invention to provide a manually operated actuator control having a provision for quickly and conveniently changing the ratio between the force exerted by the output device or actuator and the force exerted by the operator.

It is still another object of the present invention to provide a manually operated actuator control which will exert an output force which may be changed from greatly in excess of the pressure exerted by the operator's hand to only a small fraction of the force exerted by the operator's hand and still allow the operator to feel the pressure exerted regardless of the amount of the unexpected counterforce exerted by an object against the output actuator.

It is a still further object of the present invention to provide an improved manually operated actuator control having the ability to be maintained in a stalled condition for an indefinite period of time but yet which does not tend to overheat during the time it is maintained in a stalled position.

It is still a further object of this invention to provide an improved manually operated jaw control wherein the operation of the device may be changed as desired from a condition wherein the jaw grip is released when the operator relaxed his grip on the control element to a condition in which the jaws maintain their grip when the operator relaxed his grip.

It is still a further object of this invention to provide an improved manually operated actuator control in which the output actuator will lock in position when no pressure is being exerted on the control element.

Other objects and advantages will become apparent in the following specification and in the appended claims in which:

FIGURE 1 is a side elevation partly in section showing one form of the present invention;

FIGURE 2 is a transverse sectional view taken along lines 2—2 of FIGURE 1;

FIGURE 3 is a schematic diagram of another form of the present invention;

FIGURE 4 is a schematic diagram of still another form of the invention.

In FIGURE 1 there is shown a manually operated hydraulic actuator control 8 having feel-back according to the present invention which may be used in remotely controlled manipulating devices such as mechanical arms and the like. The embodiment illustrated in FIGURE 1 is used only in operating the gripping tongs 43 but it is apparent that like systems may be used to operate other motions of the mechanical arm such as rotation of the gripping mechanism, or extension of the arm.

The control device 8 is movably mounted on a fixed base 9. Motion of the extension 6 of control device 8 with respect to base 9 may be used to control other actuators (not shown) if desired such as those used for rotation or extension of the tongs or jaws 43. Extending from base 9 is a frame member 10. Pivotally mounted on frame member 10 is a valve control element or lever 11 which may turn about a suitable pivot bolt 20. Control lever 11 is provided with an upwardly extending gripping portion 12 and a horizontally extending portion 17, and frame member 10 is provided with a horizontally extending support portion 16 and an upwardly extending portion 14. Frame member 10 is provided with a horizontally disposed portion 19 to support a pressure sensing means such as feel-back actuator 51 as described more fully herein below. At the upper end of control lever 11 there is provided a hand grip opening 13 and in the upper end of frame member 10 there is provided a thumb opening 15.

Between the pivot 20 and the base 9, there are provided two hydraulic fluid control valves 21 and 22, both such valves being secured to the control frame 10. Valve 21 is located above the end of control lever 11 and valve 22 is located below the end of control lever 11. Valve 21 includes an inlet opening 25 which communicates with a source of fluid pressure such as hydraulic fluid pump 30 through accumulator 31 and fluid line or conduit 32 and an outlet 40 which communicates with output actuator 42 through line or conduit 45 and to the feel-back actuator 51 through lines 52 and 53. Valve 22 includes an inlet opening 50 which communicates with feel-back actuator 51 and actuator 42 through hydraulic fluid lines 52 and 53 respectively. Outlet port 55 communicates with the pump 30 through line 56. Valve 21 is provided with a valve port 60 therein which may be opened and closed by means of valve 61. Valve stem 62 extends downwardly from valve 61 through the casing of valve 21 and the lower end thereof designated 26 is operatively associated with the upper portion of the end of valve control lever 11. Valve 22 contains a valve port 65 and a valve 66 to open and close the port 65. Extending upwardly from valve 66 and out through the casing of valve 22 is a valve stem 67, the upper end thereof designated 68 being operatively associated with the lower end portion of valve control lever 11. Thus when the grip openings 13 and 15 of control lever 11 and frame member 10 respectively are grasped manually and brought together, the free end of valve lever 11 moves upward contacting the lower end 26 of valve stem 62 causing valve 61 to open port 60 allowing the fluid to pass through the valve 21 from duct 32 to duct 45. Likewise when the hand grip on the control lever 12 and the upper portion 14 of control lever frame 10 is released, the free end of valve lever 11 will be caused to lower causing valve 21 to close and depressing the valve 66 by contact of the lower surface of valve lever 11 with the upper portion 68 of valve stem 67 causing valve 66 to open port 65 and allowing fluid to return from ducts 52 and 53 through duct 56 to the pump 30. While valves 61 and 66 may be seated by means of hydraulic pressure within the hydraulic system, they are preferably held in the normally seated position by means of suitable springs designated 70 and 71 respectively. Valve springs 70 and 71 should not be strong enough so that the pressure exerted will be felt to any appreciable extent by the operator.

The pressure sensing means or feel-back actuator 51 comprises a cylindrical casing 80 provided with a top wall 81 and bottom wall 82. Disposed transversely therein is a movable element such as flexible diaphragm 83 attached securely to the casing 80 along its circumference 85. A number of concentric bends are provided in a diaphragm 83 to allow the diaphragm to move up or down when hydraulic fluid is introduced into chamber 88 above the diaphragm. Connected to the bottom of diaphragm 83 and extending downwardly out through the bottom of the bottom wall 82 of feel-back actuator 51 there is a feel-back output member 86. The lower end 87 of member 86 is adapted to contact the upper surface of the horizontal portion of the control lever 11. The feel-back actuator 51 is attached to the horizontally extending portion 19 of frame member 10 by means of a wing nut designated 90 which is screwed onto threaded stud 91 extending upwardly from the top of feel-back actuator 51 through slot 95. By loosening wing nut 90, the feel-back actuator 51 may be moved laterally to any desired position parallel to the horizontally extending portion of valve control lever 11 for purposes described herein below.

A short distance to the right of pivot 20 there are provided two centering springs designated 96 and 97. Spring 96 is disposed vertically above control lever 11 and the spring 97 is disposed vertically below control lever 11. The lower end of spring 96 and the upper end of spring 97 are attached to a suitable mounting bracket 98 extending outwardly from the side of control lever 11. Extending laterally from the top of the frame member 10 is a spring adjustment screw bracket 100 having an adjustment screw 101 screw threaded therein. The lower end of adjustment screw 101 is attached to the upper end of spring 96. Extending laterally from the bottom of control lever frame 10 is a spring adjustment screw bracket 105 having an adjustment screw 106 screw threaded therein. The upper end of adjustment screw 106 is attached to the lower end of spring 97. By tightening screw 101, spring 96 is compressed and the free end of the control lever 11 is biased toward opening valve 21 while tightening screw 106 will compress spring 97 and bias the control lever 11 toward opening valve 22.

The operation of the device will now be explained. The remotely located tongs 43 are opened and closed by a conventional fluid operable output actuator cylinder 42 by manually squeezing together and releasing the gripping portions 12 and 14 of control lever 11 and valve frame member 10 respectively. When the gripping portions 12 and 14 are squeezed together, the valve 21 will be opened and valve 22 will be closed causing fluid to pass into actuator cylinder 42 so that the tongs close. When the gripping portions 12 and 14 are made to separate, the free end of control lever 11 will be depressed opening valve 22 and closing valve 21, thereby withdrawing fluid from output actuator 42 and thus opening the tongs or jaws 43. When the gripping portions 12 and 14 are in an intermediate position, both valves 21 and 22 will be closed. In this condition fluid will not be able to pass either into or out of the output actuator 42. Thus, the tongs are locked in position and will neither open nor close.

The feel-back or tactile sense of the pressure being exerted by the tongs is provided by the feel-back actuator 51 which communicates with the outlet port of valve 21 through lines 52, 53 and 45 and with the inlet of valve 22 through line 52 so that when valve 21 is opened the pressure exerted by the fluid on output actuator 42 is also exerted on the top of diaphragm 83. Thus, when the gripping tongs 43 close on an object, the resistance set up by the object causes the fluid pressure in the actuator 42 to increase. The increased fluid pressure is exerted through lines 53 and 52 to chamber 88 causing diaphragm 83 and the rod 86 to exert a downward force against the top surface of the control lever 11. This force tends to separate the gripping portions 12 and 14 and can be detected by the operator as a sense of pressure proportional to the pressure exerted by the tongs against the object. Thus, when the tongs close without meeting any resistance, no outward pressure will be exerted by the gripping members 12 and 14. It should also be noted that the pressure exerted by the tongs 43 will always be proportioned to the pressure exerted by the diaphragm 83 against control lever 11. By using a suitable ratio of tong actuator area to feel-back diaphragm area, and making due allowance for any mechanical leverage in the device, the tongs may be made to grip with almost exactly the same force as applied by the operator in squeezing the control handle.

The invention has a further provision for allowing the tongs to perform duties requiring more than the strength in a man's hand. This provision consists of means for adjusting the effective point of application of force from said feel-back actuator to said control lever. If it is desired to grip with a greater amount of force, the feel-back actuator 51 may be moved to selected positions substantially parallel with the longitudinal axis of portion 17 of lever 11 by loosening wing nut 90. As a result, the ratio of the force exerted against the operator's grip with respect to the force exerted by the gripping tongs 43 may be varied. Thus, if the feel-back actuator 51 is moved closer to the pivot point 20, the gripping tongs 43 will exert an increased force in comparison to the force exerted by the operator's hand. Conversely, if the feel-back actuator 51 is moved away from the pivot 20, the pressure exerted by the gripping tong 43 will be reduced in comparison to the force exerted by the operator's hand. Thus, the provisions for changing the position of the feel-back actuator 51 allows the force exerted by the tongs 43 to be the same as the pressure exerted by the operator, or many times the force exerted by the operator or only a fraction of the pressure exerted by the operator.

The biasing springs 96 and 97 can be biased either toward opening or closing the valve 21. Thus, if adjustment screw 101 is tightened, spring 96 will be compressed and the horizontally extending portion 17 of the control lever 11 will be raised causing valve 21 to open, thus maintaining the hydraulic gripping tongs in a normally closed position. If screw 101 is loosened and the adjustment screw 106 is tightened, a greater amount of pressure will be exerted by spring 97 and the control lever 17 will be depressed causing valve 21 to close and valve 22 to open allowing suction from pump 30 to withdraw fluid from lines 56, 52 and 53 thereby maintaining the tongs 43 in a normally opened position. Maintaining the tongs 43 in a normally opened position is the preferred operating condition for the invention.

In FIGURE 3 there is shown another embodiment of the invention including a horizontally extending control lever 150 having a control handle 151 at the right side thereof. Lever 150 is pivotally mounted on pivot 152. To center the control lever 150, there are provided two springs designated 148 and 149 attached to lever 150 between pivot 152 and handle 151. These springs operate similarly to centering springs 96 and 97 described above in connection with the embodiment illustrated in FIGS. 1 and 2. Attached to the left side of control lever 150 there are four poppet valves 155, 156, 157 and 158, each of which is pivotally connected to the control lever 150 and constitute the movable elements of fluid valves 160, 163, 161 and 162 respectively. When valve control lever handle 151 is raised, valves 160 and 162 will be open while the valves 161 and 163 will be closed. Conversely, when the control lever is lowered, valves 161 and 163 will be open and valves 160 and 162 will be closed. A pump 170 transfers fluid to valves 160 and 161 through line 172. The pair of valves designated 161 and 162 and the pair of valves 160 and 163 are connected in series between the outlet and inlet of pump 170, each pair being in parallel with respect to the other pair. Part of the fluid passing through line 172 is directed through line 173 to valve 160 and a part is directed through line 174 to valve 161. If valve 161 is open, the fluid passing out of valve 161 runs through line 175 to actuator 177 at the right of a movable element such as piston 176 and through line 178 to the upper chamber of the feel-back actuator 180 which is similar in construction to the feel-back actuator of the embodiment illustrated in FIGURES 1 and 2. A flexible diaphragm 181 within actuator 180 has connected to it a downwardly extending actuator rod 182 which passes out through the bottom of the actuator casing and rests against the top surface of the control lever 150 to provide feel-back to the operator in a manner similar to that described in connection with FIGURES 1 and 2. Conversely, if valve 160 is open, the fluid passing out of valve 160 runs through line 198 to actuator 177 so as to cause piston 176 to move to the right. The inlet port of valve 162 is connected to the outlet port of valve 161 by fluid line 185 and the outlet of valve 162 is connected to the reservoir tank 186 by means of fluid line 187. The inlet of valve 163 is connected to the outlet of valve 160 by means of line 190 and the outlet of valve 163 is connected to the reservoir 186 by means of line 191 The outlet of the reservoir 186 is connected to the pump 170 by means of line 195. The outlet of valve 160 is connected to actuator 177 at the left side of piston 176 by means of line 198.

To move piston 176 to the left, control lever 151 is lowered causing valves 160 and 162 to be closed and valves 161 and 163 to be open. Fluid will then pass from the pump through lines 172 and 174 into valve 161 and through line 175 into actuator 177 and through line 178 into feel-back actuator 180. The pressure of fluid to the right of piston 176 drives the piston to the left and forces fluid to the left of piston 176 through line 198 and because valve 160 is closed through line 190 then through valve 163 and finally into the reservoir 186. When the handle 151 is raised, valves 161 and 163 are closed and 160 and 162 are open, allowing fluid to pass from the pump through lines 172 and 173, through valve 160 and out through line 198 to the left side of piston 176. Fluid pressure on the left side of piston 176 drives the piston 176 to the right causing fluid to move from the actuator 177 through line 175 then through line 185, next through valve 162 and finally through line 187 to the reservoir 186. By means of the apparatus described, a positive pressure is exerted upon the right side of piston 176 when the control handle 151 is lowered, and when the handle 151 is raised, positive pressure is produced on the left side of piston 176. The advantage of the system illustrated in FIGURE 3 is that a positive pressure can be used to drive the piston 176 in either direction, thus assuring positive action of piston 176 when it is moving either to the left or to the right. Suction on the inlet side of the pump does not have to be relied upon to move the piston 176 back to its starting position. The feel-back actuator 180 operates in a manner similar to that illustrated in FIGURES 1 and 2 so that when the piston 176 begins to move to the left and encounters an object, the resistance causes fluid pressure to be built up in lines 175 and 178 and in the upper compartment of the diaphragm chamber 180 causing diaphragm 181 to move downward and exert a force against the upper surface of lever 150 thereby allowing the operator to sense a pressure proportional to the resistance met by the piston 176.

As in the embodiment illustrated in FIGURES 1 and 2, the feel-back actuator 180 may be moved to the left and right substantially parallel to the axis of control lever 150 in order to increase or decrease the feel-back sensitivity as desired.

Referring now to FIGURE 4, there is shown still another embodiment of the invention including a horizontally disposed control lever 200 pivotally mounted on pivot 201 and movable manually up and down about pivot 201 by means of control lever handle 202. To center the control lever handle 200, there are provided between handle 202 and pivot 201, two springs 203 and 204 which may be biased towards the valve open position or towards the valve closed position as described in connection with FIGURES 1 and 2. Located above the left end of control lever handle 200 is a valve 205 having an inlet connected to the outlet of pump 206 by fluid line 207. The valve 205 is divided into an upper compartment 208 and lower compartment 209 separated by means of a wall having a valve port 210 in the center thereof. Port 210 may be opened and closed by means of poppet valve 211, the stem 212 of which is pivotally connected to the left end of valve control lever 200. When the left end of valve control lever 200 is raised, port 210 will be closed and when lowered, port 210 will be opened. Connected between valve compartment 208 and actuator 215, there is provided a fluid line 216 and connected between valve chamber 208 and the feel-back actuator 220 is a fluid line 221. When the valve is open, fluid from the pump 206 passes through port 210 into chamber 209, passes out of the valve through line 222 into reservoir 223 and back to pump 206 through line 224. A by-pass line 225 may be provided and designed in order to limit the pressure exerted by pump 206.

When the pump is in operation and port 210 is opened, fluid will pass through line 207, into valve 205, through port 210, into chamber 209, through line 222, through the reservoir 223 and back to the pump 206. Since the flow is unrestricted through the valve and reservoir only a small amount of pressure will be built up in the hydraulic actuator 215 and in the feel-back actuator 220. When, however, the handle 202 is lowered manually causing lever 200 to turn about pivot 201, poppet valve 211 will be raised, closing port 210 so that the passage of fluid into the reservoir tank through line 222 is interrupted. As a result, pressurized fluid will pass outwardly in line 216 and 221 causing the piston 230 to travel to the left and causing the diaphragm 231 and diaphragm lever 232 of the feel-back actuator 220 to be lowered. The pressure of diaphragm lever 232 against the upper surface of control lever 200 resists the downward pressure on handle 202 exerted by the operator when the actuator piston 230 meets a resistance as described above in connection with the other embodiments. A lightweight spring 240 is used to return the piston 230 to the right when valve 205 is again opened. Connecting rod 242 extending out of the casing of actuator 215 may be used to position any desired object.

Other forms of valves may be used in place of the poppet valve as illustrated. For example, a conventional spool valve may be used. If a spool valve were used, in the FIGS. 1, 2 modification, it could be pivotally connected to the free end of the horizontal extension 17 of control lever 11 and would still provide a locking action when the lever control handle is in an intermediate position. Furthermore, such a spool valve would require no springs such as springs 70 and 71.

While the feel-back device has been illustrated as a flexible diaphragm mounted in a cylindrical compartment, other types of hydraulic output devices or actuators could be used such as a conventional cylinder and piston type actuator.

Relatively small valves are preferred in the embodiments illustrated in FIGURES 1 through 4 in order to make the force exerted by the valve on the control lever arm negligible. In the embodiment illustrated in FIGURE 4, the valve 211 may be made relatively large in size and the valve head of valve 211 correspondingly larger in area so that the fluid pressure in chamber 208 of valve 205 would then exert a substantial force against the top of valve 211 when the valve was closed to provide feel-back to the operator. In the event that this modification were made, it will be apparent that the feel-back diaphragm device 220 could be eliminated. In this modification, the valve 205 should be movable with respect to the lever arm 200 when variations in sensitivity of feel-back are desired.

The embodiment illustrated in FIGURES 1 and 2 will normally be preferred because it has an advantage that the valves handle only the amount of fluid displaced by the cylinder 42 while the valves of the embodiment illustrated in FIGURE 4 must handle the entire displacement of the pump. The embodiment illustrated in FIGURE 3 is preferred where it is desired to provide a positive pressure on both sides of the actuator piston. The embodiment illustrated in FIGURE 4 will be preferred where simplicity is important but the piston 230 will have to be retracted by means of a spring or the like and cannot rely upon the negative pressure exerted at the pump intake as in the embodiment illustrated in FIGURE 1.

From the foregoing discussion, it will be apparent that the invention provides a novel and reliable means for operating actuators. It is especially valuable in remote controlled manipulators to provide a tactile sense for the operator of the pressure being exerted by the actuator on the object handled. The invention includes provision for simply and quickly changing the ratio of the force exerted by the operator and by the output actuator so that the output actuator may exert many times the strength of a man's hand or if desired the ratio may be changed so that the operator feels a fairly large force while the actuator exerts only a small force. It also includes a provision for allowing the tongs to remain normally open, normally closed or for locking the tongs in a gripping position when the operator releases his grip whichever is desired.

In view of the principles set forth herein, I have shown some of the ways of carrying out the present invention and some of the equivalents suggested by these disclosures.

Now, therefore, I claim:

1. A remotely controlled manipulator device including a hand mechanism for performing gripping motions, said hand mechanism having a pair of relatively movable gripping members, first pressure responsive actuator means for effecting gripping movement of said gripping members, means for operating said output actuator including a source of pressure, conduit means connecting said actuator to the pressure source, valve means for permitting the flow of a fluid medium from the pressure source to the actuator, said valve means also adapted to prevent the flow of said fluid medium to said actuator, lever means for opening and closing said valve means by direct contact with said valve means, second pressure responsive actuator means providing manual sensing of the magnitude of the gripping force being exerted by the gripping members on an object, said second pressure responsive actuator means operatively connected between the valve means and the first actuator means, said second actuator means provided with an output member which directly contacts the lever means and exerts a force against said lever means, and means for varying the effective relative position of said second pressure responsive actuator means with respect to the lever means whereby the ratio of the force exerted by the gripping members with respect to the force exerted by the operator of the manipulator may be varied.

2. In a remotely controlled manipulator system a hand mechanism for performing gripping motions, said mechanism having a pair of relatively movable gripping members, an actuator for effecting gripping movement of said gripping members, a source of fluid pressure, means for operatively connecting said actuator to said source, valve means for controlling the flow of a fluid medium from said source to said actuator, means for opening and closing said valve means by direct contact with said valve means, the improved combination comprising pressure responsive sensing means operatively connected to the valve opening and closing means and the gripping members whereby the pressure exerted by said gripping members on an object can be manually sensed.

3. The combination of claim 1 wherein the lever means for operating the valve means includes an elongated member pivotally connected to a base member, a first end of said member having a handle thereon for manual control, the second end of said member adapted to engage the valve means so as to actuate said valve means in response to pivotal movement of said lever relative to the base member.

4. The combination of claim 1 wherein the lever means includes an L-shaped member which includes a horizontal leg and a vertical leg, said vertical leg including means for manually gripping said leg, a base member, means for pivotally connecting said L-shaped member to the base member, and biasing means for orienting said L-shaped member in a desired relative position.

5. The combination of claim 3 wherein the second pressure responsive actuator means includes a feel-back actuator responsive to fluid pressure, the output member forming a part of said actuator, means for mounting said feel-back actuator so that said output member contacts a portion of the elongated member, and conduit means for operatively connecting said actuator to the output actuator.

6. A remotely controlled manipulator device including a hand mechanism for performing gripping motions, said hand mechanism having a pair of relatively movable gripping members, a pressure responsive output actuator for effecting gripping movement of said gripping members, means for operating said actuator means including a source of pressure, at least two control valves for controlling the flow of a fluid medium from said source of pressure, means for operating said control valves independently of each other, said valve operating means including an elongated lever pivotally connected at a point between its two ends to a base member, one end of said lever being positioned between said control valves and adapted to engage at least one of said valves in response to pivotal movement of said lever relative to the base member, pressure responsive means providing manual sensing of the magnitude of the gripping force being exerted by the gripping members on an object, said pressure responsive means operatively connected between the pair of control valves and the output actuator, and means for mounting said pressure responsive means relative to the base member so that it contacts a portion of the lever.

7. The combination of claim 6 wherein the pressure responsive means includes a feel-back actuator responsive to fluid pressure, said actuator having an orifice, a relatively movable output member which contacts a portion of the pivotal lever and which exerts pressure on said lever when the output actuator meets resistance to motion, and a variable volume chamber between said orifice and said output member.

8. The combination of claim 7 wherein the variable volume chamber is formed by the sides of the actuator, one end of said actuator, and a flexible diaphragm located within the actuator between the orifice and the output member.

9. A remotely controlled manipulator device including a hand mechanism for performing gripping motions, said hand mechanism having a pair of relatively movable gripping members, a first pressure responsive actuator for effective movement of said gripping members, an actuator control comprising a source of pressure, means for controlling the flow of a fluid medium from said pressure source, said means including a first control valve and a second control valve, a control lever for opening and closing said first and second valves, a second pressure responsive actuator to provide feel-back, said second actuator operatively connected to the first actuator by conduit means, said second actuator provided with an output member which is adapted to contact a portion of said control lever and exert pressure on said lever when the first actuator meets resistance to motion, thus permitting manual sensing of the magnitude of gripping force being exerted by the gripping member on an object.

10. A remotely controlled manipulator device including a hand mechanism for performing gripping motions, said hand mechanism having a pair of relatively movable gripping members, a first fluid pressure responsive actuator for effecting gripping movement of said gripping members, means for operating said first actuator including a source of fluid pressure having an inlet and an outlet, means for controlling the flow of a fluid medium from the pressure source, said means including a first flow control valve and a second flow control valve connected in series between the outlet and the inlet of said pressure source, lever means for opening and closing said first and second control valves, said lever means being so arranged that opening of one of said valves closes the other of said valves, and a second fluid pressure responsive actuator operatively connected to the first actuator, said second actuator contacting a portion of the lever means to exert pressure against said lever means proportional to fluid pressure within the first actuator, said second actuator connected between the means for controlling the flow of fluid from the pressure source and the first actuator.

11. A remotely controlled manipulator device including a hand mechanism for performing gripping motions, said hand mechanism having a pair of relatively movable gripping members, a first fluid pressure responsive actuator for effecting movement of said gripping members, means for operating said first actuator including a source of fluid pressure having an inlet and an outlet, means for controlling the flow of fluid from the pressure source, said means including a control valve, lever means for opening and closing said control valve, said lever means pivotally connected at a point between its two ends to a base member, one end of said lever means adapted to engage the control valve in response to pivotal movement of said lever means relative to the base member so as to open and close said control valve, and a second fluid pressure responsive actuator operatively connected to the first actuator, said second actuator contacting a portion of the lever means to exert pressure against said lever means proportional to fluid pressure within the first actuator, said second actuator connected between the means for controlling the flow of fluid from the pressure source and the first actuator.

12. A remotely controlled manipulator device including a hand mechanism for performing gripping motions, said hand mechanism having a pair of relatively movable gripping members, a first fluid responsive actuator for effecting movement of said gripping members, means for operating said first actuator including a source of fluid pressure having an inlet and outlet, means for controlling the flow of fluid from the pressure source, said means including a first pair of control valves connected in series between the outlet and the inlet of said pressure source and a second pair of control valves connected in series between the outlet and the inlet of the said pressure source, said first pair of control valves connected in parallel with respect to said second pair, lever means for opening and closing said valves, said valves being so arranged that one valve of each pair will be open when the other valve of that pair is closed, conduit means connecting said first pair to the first actuator, conduit means connecting said second pair to the first actuator, and a second fluid pressure responsive actuator operatively connected to the first actuator, said second actuator contacting a portion of the lever means to exert pressure against said lever means proportional to fluid pressure within the first actuator, said second actuator connected between the means for controlling the flow of fluid from the pressure source and the first actuator.

References Cited by the Examiner

UNITED STATES PATENTS

| 2,383,682 | 8/45 | Price. | |
| 2,530,659 | 11/50 | Hill | 121—38.1 |
| 2,573,403 | 10/51 | Church. | |
| 2,627,847 | 2/53 | Clark et al. | |

FOREIGN PATENTS

| 670,085 | 11/29 | France. |
| 234,502 | 10/25 | Great Britain. |

HUGO O. SCHULZ, *Primary Examiner.*

ALAN BLUM, KARL J. ALBRECHT, *Examiners.*